Patented Jan. 19, 1943

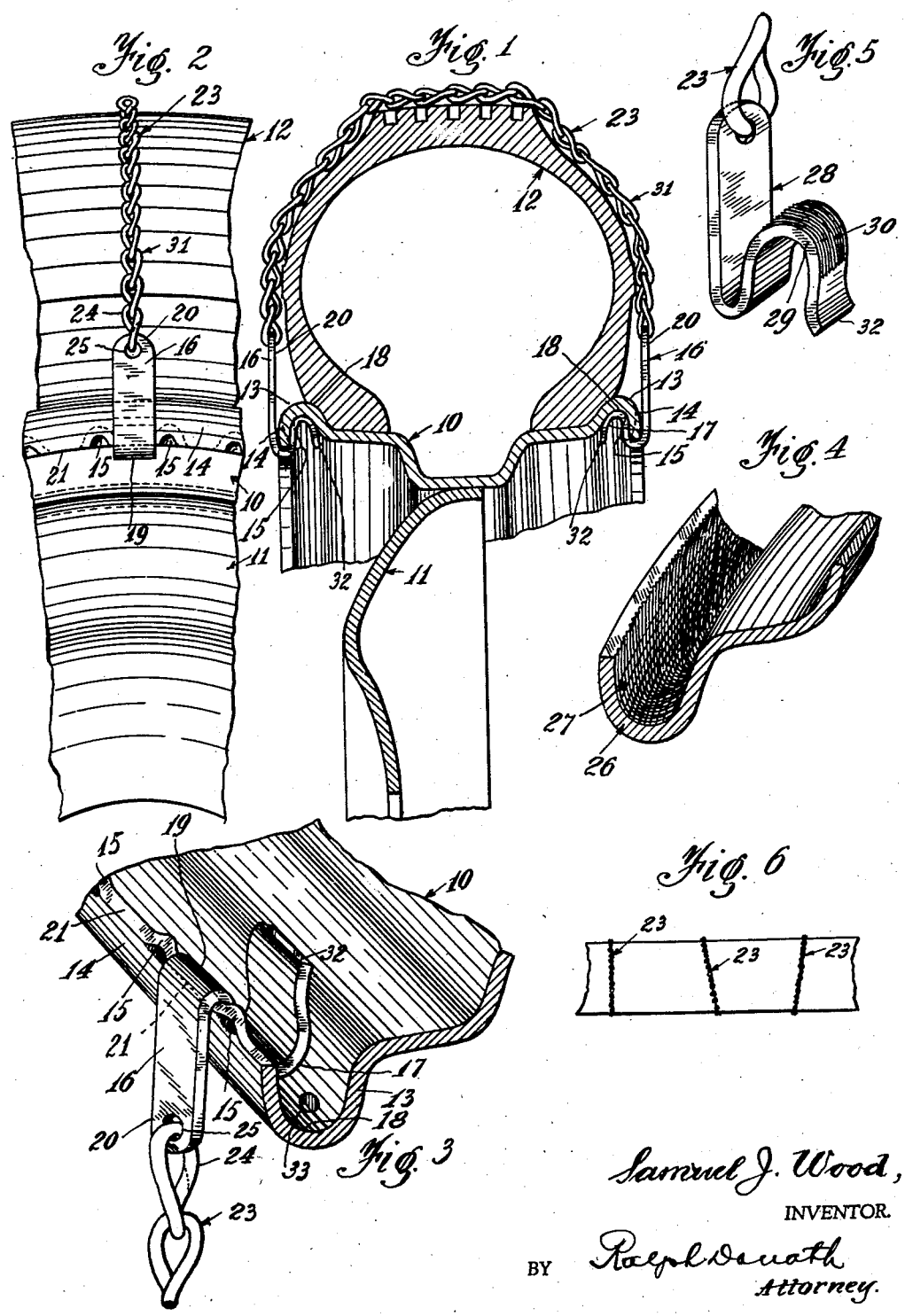

2,308,904

UNITED STATES PATENT OFFICE 2,308,904

ANTISKIDDING DEVICE

Samuel J. Wood, Pittsburgh, Pa.

Application July 5, 1941, Serial No. 401,108

1 Claim. (Cl. 152—236)

This invention relates to anti-skidding devices and more particularly to such devices which are applicable to tires for automobiles, auto-trucks and other motor vehicles.

One of the objects of the invention is to provide a new and improved anti-skidding device for automobile wheels arranged for the attachment of a plurality of independent cross-chains secured to the tire rim with means for their ready and rapid attachment to, or removal from the tire whenever it is desired to do so.

Another object of the present invention is to provide a plurality of independent cross-chains secured to the rounded channel rings of the wheel rim which are held firmly in place without the obviation of facility in attaching or removing the same.

Still another object of the invention is to provide the automobile tire rim with annular channel rings, the outer peripheral edges of which have a plurality of equally spaced radial crimps adapted to prevent creeping of the cross-chains.

Yet another object of the invention is to provide a vehicle tire rim at the exposed outer ends with annular channel rings, the inner faces of which being provided with transverse and parallel incisions or scorings arranged to prevent circumferential creeping of the cross-chain members.

Still another object of the present invention is to provide a vehicle tire with a plurality of individual cross-chain members extending across the tires which may be attached to the tire rim in a skewed position should the cross-chain members be too loose on the tire.

Other objects of the invention are to provide a plurality of anti-skid cross-chains for tires which will prevent the cross-chains from creeping circumferentially of the wheel, with respect to the means which support them and at the same time maintain the cross-chains in a fixed relation circumferentially of the wheel.

A further object of the present invention is to provide an anti-skidding device which is exceedingly simple and durable in construction and cheap to manufacture.

Yet another object of the invention is to provide an anti-skidding device which may be readily attached to, or removed from the tires without raising the vehicle wheels from the ground.

With these and other objects in view, the invention consists of certain novel features of construction, as hereinafter shown and described and then specifically pointed out in the claim.

Two practical embodiments of the invention are represented in the accompanying drawing forming a part of this specification in which similar character references indicate corresponding parts in the several views, in which:

Figure 1 is a cross-section through the rim and tire of a wheel in accordance with the invention.

Figure 2 is a fragmentary side elevation of a tire and rim showing one of the cross-chain members in position.

Figure 3 is an enlarged, fragmentary isometric view showing a tire rim provided at its outer circumferential edges with equi-distantly spaced and inwardly directed crimps including one of the cross-chain member attaching means applied to a tire rim between a pair of crimps to prevent circumferential creeping of the cross-chain member.

Figure 4 is a fragmentary, enlarged isometric view, partly in section and partly broken away, of a portion of a tire rim showing the interior of the tire rim channel ring provided with closely spaced, transverse and parallelly disposed scores or incisions adapted to interlock with similar incisions of the attaching members of the cross-chain members (Figure 5).

Figure 5 is an isometric view of one of the attaching members as used with the tire rim shown in Figure 4.

Figure 6 is a diagrammatic top view of a portion of an automobile wheel showing the cross-chain members attached in normal and skewed relation.

Referring now to Figures 1 to 3 inclusive, the tire rim 10 of the vehicle wheel 11 which supports the pneumatic tire 12 is provided at its outer ends with U-shaped channel rings 13. The outer faces 14 of the latter are provided with a plurality of equi-distantly spaced crimps 15 sufficiently spaced apart to freely accommodate the attaching member 16, in a manner as best shown in Figure 3.

Each of the chain attaching members 16, preferably made of strip steel or other suitable material, is bent in the form of an S-shaped hook and is provided with a U-shaped end 17 which, when in position, fits against the inner surface 18 of said channel ring 13, while the bight 19, which connects the U-shaped end 17 with the chain end 20 embraces the edge 21 between the crimps 15 of the tire rim 10 as shown in Figure 3.

The U-shaped free end 17 of the chain attaching member 16, which corresponds approximately to the curvature of the U-shaped channel ring or groove 13 of the tire rim 10, is slightly flexible which facilitates its attachment to and disengagement from the channel ring 13 of the rim 10.

The chains 23 of which each wheel is provided with a convenient number, are secured to the chain end 20 of the attaching members 16 by inserting an open terminal link 24 through the aperture 25 of said chain end 20 of attaching member 16, the ends of which are then welded together in a well known manner.

In the modification shown in Figures 4 and 5 the crimps 15 shown in Figures 1 to 3 inclusive around the tire rim 10 are eliminated, instead the interior face of the U-shaped channel rings or grooves 26 are provided with closely spaced, transverse and parallelly disposed incisions or scores 27.

The chain attaching member 28 shown in Figure 5 is of the same configuration as the one previously described and which is shown in Figure 3 of the drawing, with the exception that the exterior area of the U-shaped end 29 of the attaching member 28 is provided with closely spaced, parallel incisions or scores 30 adapted to engage corresponding incisions 27 of the tire rim when in position.

Any desired number of anti-skidding members 31 may be arranged around the tire, uniformly or otherwise, and the same may be readily applied to the wheel by inserting the U-shaped ends of the attaching members 16 into the correspondingly U-shaped channel rings 13 of the tire rim in a manner as best shown in Figure 3.

The free end 32 of the U-shaped end 17 of the attaching member 16 is slightly flexible so as to permit same to spring into the correspondingly shaped channel ring 13 of rim 10, when applied, and this may be readily accomplished by tapping the bight 19 with a bar or other suitable means until the underside of said bight strikes the edge of the tire rim 10.

When it is desired to remove the anti-skidding member 31 from the wheel it is only required to pry a screw-driver or similar tool between the rim 10 and the free end 32 of the attaching member 16, thereby disconnecting the chain attaching member from the tire rim.

Thus it will be noticed that the anti-skidding members can be readily placed in position on the wheel or removed therefrom whenever it is desired to do so.

When the wheel is turning and one of the anti-skidding chains moves into contact with the ground the chain attaching members 16 exert a pull on the tire rim, but due to its anti-creeping features previously described the chains are always retained in the same position on the peripheral face of the wheel tire.

Several drain-holes 33 are provided around the channel ring 13 to permit drainage of water which may accumulate while the vehicle is standing still.

Referring now to Figure 6, it will be observed that the cross chain members 31 may be attached to the tire rim in skewed arrangement which may be often desirable if, for instance, the peripheral face or treads of the tire had worn off in which case the chain would be too loose if extended across the peripheral face of the tire.

From the foregoing description taken in connection with the accompanying drawing, the construction of the devices and the method of operation will be readily apparent to those skilled in the art to which the invention appertains, and while describing the principle of operation of the invention together with the devices which are now considered to be the best embodiments thereof, it is to be understood the various changes in the form, proportion and the minor details of construction may be resorted to without departing from the principle or sacrificing any of the advantages of the invetnion as defined in the appended claim.

I claim:

In an anti-skid device comprising in combination a wheel including a tire secured to a tire-rim having an integral channel-ring at each side thereof; each channel-ring being substantially U-shaped in cross-section and having at the U-shaped inner surface thereof transverse and closely spaced, parallel incisions; a plurality of individual cross-chain members extending transversely across said tire secured to said channel-rings; said cross-chain members provided with S-shaped attachment pieces, each having a U-shaped end which registers transversely with the U-shaped inner surface of said channel-rings; the exterior surface of the U-shaped end of said attachment pieces having transverse and closely spaced, parallel incisions adapted to engage, when in position, with the corresponding incisions of the channel-ring of said tire-rim whereby peripheral creeping of the cross-chain members is prevented.

SAMUEL J. WOOD.